United States Patent [19]

Sampath

[11] Patent Number: 4,640,358
[45] Date of Patent: Feb. 3, 1987

[54] OIL RECOVERY PROCESS EMPLOYING A COMPLEXED POLYSACCHARIDE

[75] Inventor: Krishnaswamy Sampath, Carrollton, Tex.

[73] Assignee: Mobil Oil Corporation, New York, N.Y.

[21] Appl. No.: 735,002

[22] Filed: May 17, 1985

Related U.S. Application Data

[62] Division of Ser. No. 593,464, Mar. 26, 1984, abandoned.

[51] Int. Cl.$^4$ .............................................. E21B 43/22
[52] U.S. Cl. .................................... 166/274; 106/208; 252/315.3; 252/8.554
[58] Field of Search ..................... 166/274; 106/208; 252/8.55 D, 315.3

[56] References Cited

U.S. PATENT DOCUMENTS

| | | | |
|---|---|---|---|
| 3,301,848 | 1/1967 | Halleck | 106/162 X |
| 3,372,749 | 3/1968 | Williams | 166/274 |
| 4,021,355 | 5/1977 | Holtmyer et al. | 252/8.55 |
| 4,040,484 | 8/1977 | Hessert | 166/294 |
| 4,048,079 | 9/1977 | Clampitt et al. | 252/8.55 X |
| 4,110,230 | 8/1978 | Hessert et al. | 252/315.3 X |
| 4,265,673 | 5/1981 | Pace et al. | 252/8.55 X |
| 4,369,124 | 1/1983 | Elphingstone et al. | 252/8.55 X |
| 4,457,372 | 7/1984 | Doster et al. | 252/8.55 X |
| 4,519,844 | 5/1985 | Chaux et al. | 252/315.3 X |

*Primary Examiner*—Herbert B. Guynn
*Attorney, Agent, or Firm*—A. J. McKillop; M. G. Gilman; J. P. O'Sullivan, Sr.

[57] ABSTRACT

The polyvalent metal ion complex of a fungal polysaccharide, e.g. scleroglucan, aqueous fluids thickened thereby and enhanced oil production processes utilizing said thickened aqueous fluids.

14 Claims, No Drawings

OIL RECOVERY PROCESS EMPLOYING A COMPLEXED POLYSACCHARIDE

BACKGROUND OF THE INVENTION

This is a division of co-pending application Ser. No. 593,464, filed Mar. 26, 1984, now abandoned.

This invention relates to producing hydrocarbons from a hydrocarbon-containing subterranean formation employing a complexed polysaccharide.

Processes for the production of petroleum from a petroleum-containing subterranean formation employing an aqueous driving fluid containing a thickening agent are well known.

Oil accumulated within a subterranean formation can be recovered, or produced, through wells from the formation using the natural energy within the formation. However, producing operations deplete the natural energy relatively rapidly. Thus, a large amount of the oil is left in a subterranean formation if only the natural energy is used to produce the oil. This production by depletion of the natural energy is often referred to as primary production. Where natural formation energy is inadequate or has become depleted, supplementary operations, often referred to as secondary recovery operations, are used to improve the extent of recovery of the oil. In the most successful and most widely used supplemental recovery operations, a fluid is injected through an injection means, comprising one or more injection wells. The fluid is passed into the formation, displacing oil within and moving it through the formation. the oil is produced from production means, comprising one or more production wells, as the injected fluid passes from the injection means toward the production means. In a particular recovery operation of this sort, water is employed as the injected fluid, and the operation is referred to as waterflooding. The injected water is referred to as the flooding water as distinguished from the in-situ, or connate, water.

While conventional waterflooding is effective in obtaining additional oil from an oil-containing subterranean formation, it has a number of shortcomings. Foremost among these shortcomings is the tendency of flooding water to "finger" through an oil-containing formation and to bypass substantial portions thereof. By fingering is meant the developing of unstable bulges or stringers which advance toward and into the production means more rapidly than the remainder of the flooding water. Furthermore, the water does not normally displace as much oil in the portions of the formation which it contacts as it potentially is capable of doing.

It has been established that waterfloods perform less satisfactorily with viscous oils than with relatively non-viscous oils. The fingering and bypassing tendencies of the water are related to the ratio of the viscosity of the flooding water to that of the oil. The viscosities of different oils vary from as low as less than 1 or 2 centipoises to 1,000 centipoises or higher. Water has a viscosity of about 1 centipoise under atmospheric conditions.

Past suggestions for increasing the viscosity of flooding water have included incorporating water-soluble thickening additives in the water. Additives that have been suggested for this purpose include a wide variety of naturally occurring gums, sugars, and polymers. The bacterially produced heteropolysaccharides have been especially interesting an an additive for thickening flooding water. U.S. Pat. No. 3,020,207 discloses a process where the thickening agent is a heteropolysaccharide that has been reacted with an aldehyde, the heteropolysaccharide being a fermentation product produced by the action of bacteria of the genus Xanthomonas upon a carbohydrate. All patents referred to herein are incorporated in their entirety herein by reference. U.S. Pat. No. 3,352,358 discloses a process employing a thickened aqueous driving fluid where the thickening agent is polyvinyl alcohol sulfate. U.S. Pat. No. 3,372,749 discloses a process employing a thickened aqueous driving fluid wherein the thickening agent is a poly(glucosylglucan).

It is an object of this invention to improve the methods of recovering hydrocarbons from a hydrocarbon-containing subterranean formation by utilizing an improved thickened fluid in the drilling for said hydrocarbons or in any of the direct or indirect techniques for displacing hydrocarbons from said formation.

It is another object of this invention to provide a novel composition of matter.

It is yet another object to provide a novel aqueous liquid thickened with said composition of matter.

It is still another object to provide a process for preparing said compositions.

SUMMARY OF THE INVENTION

The present invention is concerned with a polyvalent metal ion complex of a fungal polysaccharide. More particularly, the present invention is concerned with a polyvalent metal ion complex of a scleroglucan having the structural formula:

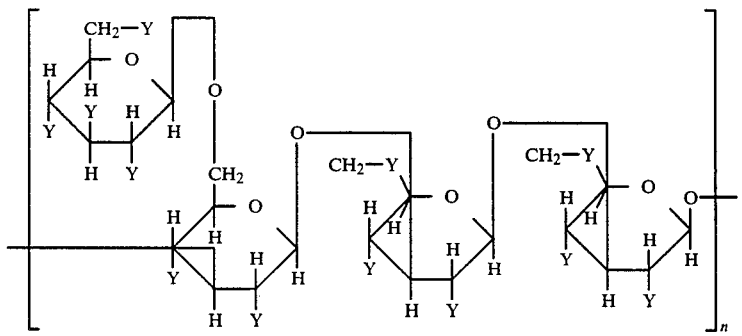

wherein Y is a member of the class consisting of OH, OCH$_2$COOH, OSO$_3$H, OCS$_2$H, and mixtures thereof and n is an integer having a value of at least 30.

Hereinafter and in the claims, for ease of expression it will be understood that the phrase "polyvalent metal ion complex of scleorglucan" refers to the complexes of the foregoing structural formula. Other fungal polysaccharides include *plectania* and *helotium* polysaccharides and their polyvalent metal ion complexes are contemplated herein.

The contemplated polyvalent metal ion is of a member selected from the group consisting of phosphorus, scandium, titanium, vanadium, chromium, manganese, iron, cobalt, copper, aluminum, arsenic, yttrium, zirconium, niobium, cadmium, tin, antimony, lanthanum, hafnium, tantalum, lead and mixtures thereof. Particularly preferred polyvalent metal ions are of chromium and titanium. A preferred utility for the polyvalent metal ion complex defined above is as a thickening agent for aqueous liquids for employment in oil recovery generally.

The present invention is also concerned with a method wherein a fluid medium is introduced into a borehole in the earth and into contact with a subterranean formation penetrated by said borehole. The improvement in this process is wherein at least a portion of the fluid medium comprises an aqueous gel wherein said gel comprises water having incorporated therein a water thickening amount of a polyvalent metal ion complex of scleroglucan. The polyvalent metal ion is a member selected from the above mentioned group and preferred metal ions are chromium and titanium.

In a preferred method the borehole comprises an injection well and said formation comprises an oil bearing formation which is also penetrated by a production well. This method is a fluid drive process carried out for the recovery of oil from the formation by injecting a drive fluid into said formation via said injection well and driving oil to said production well. The fluid medium comprising said aqueous gel is introduced into said injection well and into the pore of said formation. In one embodiment the formation is of non-uniform permeability and comprises at least one zone of relatively high permeability and at least one zone of relatively low permeability. The fluid medium is injected into the formation prior to injecting the drive fluid into the formation by way of said injection well in the fluid drive process for driving oil to said production well.

In another embodiment of the process the formation is of non-uniform permeability and comprises at least one zone of relatively high permeability and at least one zone of relatively low permeability and the fluid medium is injected into said formation subsequent to having injected a drive fluid into said formation by way of said injection well in the fluid drive process for driving said oil to the production well.

The present invention is concerned with a method of recovering oil from an oil-containing subterranean formation penetrated by a bore hole which comprises injecting into said borehole an aqueous liquid thickened with the above-identified poly(glucosylglucan). In a more particular technique of recovering oil from an oil-containing subterranean formation, it is contemplated to employ an injection means and a production means which involves injecting through said injection means and into the subterranean formation an aqueous liquid containing a thickening amount of the above-identified polyvalent metal complex.

The invention also comprises a method of preparing the polyvalent metal ion complex defined above comprising dissolving said poly(glucosylglucan) in water and adding thereto a water-solution of a reducing agent and thereafter a water-soluble polyvalent metal compound thereto.

DETAILED DESCRIPTION OF THE INVENTION

The subject polysaccharides, i.e. the scleroglucan and its derivatives are disclosed in U.S. Pat. No. 3,301,848 issued Jan. 31, 1967. The disclosure of this and any other referenced subject matter is incorporated herein by reference in its entirety.

Scleroglucan is a capsular polysaccharide secreted by the mycelia of certain imperfect fungi, notably by species of the genus *sclerotium*. This unique structured polysaccharide was extracted from *sclerotium glucanicum* by Halleck, see the next-above referenced U.S. Patent. This scleroglucan, which is substantially a liner chain of anhydroglucose units linked beta 1-3 with 30-35% of the linear chain units and bearing single appended anhydroglucose units linked beta 1-6, is a neutral or non-ionic glucan. Thus, this glucan would not be expected to be susceptible to cross-linking or complexing by polyvalent metal ions. The fact that it is is an unexpected aspect discovered by the present inventor. The *plectania* and *helotium* polysaccharides are described in Industrial Gums, Academic Press, N.Y. and London, 1973, Chapter XXI.

U.S. Pat. No. 3,372,749, issued to S. A. Williams, Mar. 12, 1968 and U.S. Pat. No. 4,347,146, issued to M. K. Abdo, Aug. 31, 1982 disclosed the employment of a poly(glucosylglucan) as a thickening agent for an aqueous driving fluid in a process for producing petroleum from a petroleum-bearing subterranean formation. The term "poly(glucosylglucan)" is equivalent to the hereinabove employed scleroglucan produced by the aforementioned organism. Commercially available scleroglucan is sold under the trade names "Polytran" from the Pillsbury Company, Minneapolis, Minn. and "Actigum CS-11", available from CECA S.A., Versailles, France.

As used herein the term solution includes dispersions which also significantly increase the viscosity of water.

The scleroglucan employed in the aqueous liquids contemplated herein can be present in a concentration sufficient to increase the viscosity of water. Usually a concentration of from about 0.005% by weight to about 1% by weight or more of the scleroglucan can be employed. Usually a concentration of from about 0.01 to about 0.3% by weight is employed. The preferred concentration range is from about 0.03 to about 0.1% by weight.

When employing the thickened aqueous composition as the thickened flooding water, it may comprise the entire flooding liquid displacing the oil within the subterranean formation toward the production means. Ordinarily, however, a slug of thickened floodwater up from about 0.01 to about 0.25 pore volume will prove to be economically advantageous in recovering oil from the subterranean formation.

In preparing the thickened aqueous liquid according to the present invention, either fresh or saline water can be employed. By fresh water is meant either distilled water, deionized water or water containing a comparatively low, i.e. less than 30,000 parts per million, dissolved salts. by saline water is meant water containing more than about 30,000 parts per million dissolved salts.

As indicated above, the polyvalent metal ion complex of the scleroglucan is prepared by forming a water solution of the polysaccharide in water, adding a reducing agent thereto and thereafter adding a water-soluble polyvalent metal compound thereto. Examples of reducing agents include thioacetamide, hydrazine dihydrochloride, hydrazine phosphite, p-hydrazinobenzoic acid, ferrous chloride, ferrous sulfate, potassium thiosulfate, sodium thiosulfate, sodium sulfite, potassium metabisulfite, sodium metabisulfite, potassium bisulfite, sodium bisulfite, potassium sulfite, sodium metabisulfite, potassium hydrosulfite, sodium hydrosulfite, hydrogen sulfide, sodium sulfide, hydroquinone, and mixtures thereof.

Examples of water soluble polyvalent metal compounds which can be the precursor for the subject metal ions are phosphorous thiobromide, scandium nitrate, titanium tetrachloride, vanadium tribromide, chromium dichloride, manganese diiodide, iron bromide hexahydrate, cobalt chloride dihydrate, copper perchlorate, aluminum bromide hexahydrate, arsenic pentafluoride, yttrium bromide, zirconium tetrachloride, niobium oxychloride, cadmium iodate, tin dibromide diiodide, antimony trioxide, lanthanum chloride, hafnium oxychloride, tantalum fluoride, lead chlorate and mixtures thereof.

Examples of the preparation of thickened aqueous liquids having the utilities disclosed herein are prepared according to the following techniques.

EXAMPLE 1

Scleroglucan, commercially available from CECA, S.A., is added to tap water to yield a thickened solution containing 0.1% by weight of the polymer. This solution has a viscosity of 2926 centipoise at 25° C. when measured using a Contraves viscometer at a shear rate of $0.109 \, \text{sec}^{-1}$.

EXAMPLE 2

To the thickened solution of Example 1, was added a 10% solution of sodium dithionite, to yield a concentration of 0.25% of the reducing agent. A 10% solution of $Na_2Cr_2O_7 \, 2H_2O$ was added to yield a concentration of 0.5%. This resulted in a thickened aqueous product having a viscosity of greater than 40,000 centipoise employing the same shear rate and instrument as employed in Example 1.

EXAMPLE 3

Example 2 was repeated without the use of the sodium dithionite and replaced the chromium compound with Tyzor AA, i.e. diisopropoxy bis(acetylacetone) titanate (AA) see, Kirk-Othmer, Volume 23, page 189. This material is available from Halliburton Inc. No viscosity increase was noted.

EXAMPLE 4

Example 3 was repeated except sodium dithionite was also added. As in Example 2, an extraordinary increase in viscosity occurred. This and the gel of Example 2 are shear-thinnable and reversibly thickens with the absence of shear.

In order of addition of the components for forming the polyvalent metal ion complexes is not important.

It is to be understood that the present invention may be employed in conjunction with techniques which lower the interfacial tension between flooding water and the oil. For example, a lowered interfacial tension between the flooding water and the in-situ oil may be effected by flooding ahead of the thickened flooding water, a slug of a miscible fluid which may contain dissolved therein a surfactant. By miscible is meant a fluid which is miscible with the in-situ oil. Liquid hydrocarbons having boiling points from 30° to 500° F. and $CO_2$ illustrate suitable miscible fluids. The slug of miscible fluid is about 0.01 to 0.5 of the volume of the thickened flooding water. In operation, the miscible fluid displaces the oil and the thickened flooding water which is less mobile than the miscible fluid displaces the oil and the miscible fluid without fingering. Petroleum sulfonates or alkylphenoxypoly(ethyleneoxy) ethanols are examples of suitable surfactants.

The present invention contemplates the in-situ formation of the thickened aqueous fluids of the present invention. For example, a water solution of the reducing agent can be injected into the injection means of a injection and production system. Thereafter, a water solution of the scleroglucan is injected into the injection means. A water solution of the polyvalent metal compound is then injected into the injection means. The sequence of introduction of the three components into the injection means is not critical.

What is claimed is:

1. In a method wherein a fluid medium is introduced into a borehole in the earth and into contact with a subterranean formation penetrated by said borehole, the improvement wherein at least a portion of said fluid medium comprises an aqueous gel and wherein said gel comprises water having incorporated therein:

a water thickening amount of a member selected from the group consisting of titanium ion and chromium ion complex of a fungal polysaccharide, having a linear chain of anhydroglucose units linked beta 1-3 with 30-35% of the linear chain units and bearing single appended anhydroglucose units linked beta 1-6, said complex being prepared by forming a water solution of the polysaccharide and adding thereto a water soluble reducing agent and a water soluble member selected from the group consisting of titanium compounds and chromium dichloride to form said complex.

2. The method of claim 1 wherein said polysaccharide is a scleroglucan.

3. The method of claim 2 wherein the polyvalent metal ion is chromium.

4. The method of claim 2 wherein the polyvalent metal ion is titanium.

5. The method of claim 1 wherein said borehole comprises an injection well; said formation comprises an oil bearing formation and is also penetrated by a production well; said method is a fluid drive process carried out for the recovery of oil from said formation by injecting a drive fluid into said formation via said injection well and driving oil to said production well; and said fluid medium comprising said aqueous gel is introduced into said injection well and into the pores of said formation.

6. The method of claim 5 wherein:
said formation is of nonuniform permeability and comprises at least one zone of relatively high permeability and at least one zone of relatively low permeability; and said fluid medium is injected into said formation prior to injecting drive fluid into said formation via said injection well in said fluid drive process for driving said oil to said production well.

7. The method of claim 6 wherein said polyvalent metal ion is chromium.

8. The method of claim 6 wherein said polyvalent metal ion is titanium.

9. The method of claim 5 wherein:
said formation is of nonuniform permeability and comprises at least one zone of relatively high permeability and at least one zone of relatively low permeability; and said fluid medium is injected into said formation subsequent to having injected a drive fluid into said formation via said injection well in said fluid drive process for driving said oil to said production well.

10. The method of claim 9 wherein said polyvalent metal ion is chromium.

11. The method of claim 9 wherein said polyvalent metal ion is titanium.

12. In a method wherein a fluid medium is introduced into a borehole in the earth and into contact with a subterranean formation penetrated by said borehole, the improvement wherein at least a portion of said fluid medium comprises an aqueous gel formed in-situ in said subterranean formation by the sequential addition in any sequence of aqueous solutions of a fungal polysaccharide, having a substantially linear chain of anhydroglucose units linked beta 1-3 with 30-35% of the linear chain units and bearing single appended anhydroglucose units linked beta 1-6, a reducing agent and a water-soluble member selected from the group consisting of titanium compounds and chromium dichloride.

13. The method of claim 12 wherein said polysaccharide is a scleroglucan.

14. The method of preparing a member selected from the group consisting of a titanium ion and a chromium ion complex of a fungal, nonionic polysaccharide selected from the group consisting of scleroglucan, plectania polysaccharide and helotium polysaccharide comprising:
forming a water solution of said polysaccharide; and
adding thereto, simultaneously or in any sequence, a water soluble reducing agent and a water-soluble member selected from the group consisting of titanium compounds and chromium dichloride to form said complex.

* * * * *